United States Patent
Zhu (10) Patent No.: US 12,155,964 B2
(45) Date of Patent: Nov. 26, 2024

(54) DISPLAY CONTROL METHOD FOR ULTRA HIGH DEFINITION TELEVISION AND 8K ULTRA HIGH DEFINITION TELEVISION

(71) Applicant: KONKA GROUP CO., LTD., Shenzhen (CN)

(72) Inventor: Rui Zhu, Shenzhen (CN)

(73) Assignee: KONKA GROUP CO., LTD. (CN)

( * ) Notice: Subject to any disclaimer, the term of this patent is extended or adjusted under 35 U.S.C. 154(b) by 105 days.

(21) Appl. No.: 17/925,167

(22) PCT Filed: Dec. 3, 2020

(86) PCT No.: PCT/CN2020/133654
§ 371 (c)(1),
(2) Date: Nov. 14, 2022

(87) PCT Pub. No.: WO2021/243991
PCT Pub. Date: Dec. 9, 2021

(65) Prior Publication Data
US 2023/0179737 A1    Jun. 8, 2023

(30) Foreign Application Priority Data

Jun. 3, 2020  (CN) .......................... 202010496174.7

(51) Int. Cl.
| H04N 7/015 | (2006.01) |
| G09G 3/32 | (2016.01) |
| H04N 19/00 | (2014.01) |

(52) U.S. Cl.
CPC .............. *H04N 7/015* (2013.01); *G09G 3/32* (2013.01); *H04N 19/00* (2013.01); *G09G 2340/0407* (2013.01)

(58) Field of Classification Search
CPC .......... H04N 7/015; H04N 19/00; G09G 3/32; G09G 2340/0407
See application file for complete search history.

(56) References Cited

U.S. PATENT DOCUMENTS

| 2013/0082615 A1* | 4/2013 | Williams ............... H05B 45/52 |
| | | 315/186 |
| 2014/0118582 A1 | 5/2014 | Artyomov ..................... 348/242 |

(Continued)

FOREIGN PATENT DOCUMENTS

| CN | 103024313 | 4/2013 | ............. H04N 5/44 |
| CN | 103618868 | 3/2014 | ............. H04N 5/917 |

(Continued)

OTHER PUBLICATIONS

First Office Action issued in Chinese Patent Appln. Serial No. 202010496174.7, dated Jan. 26, 2021, with English translation, 11 pages.

(Continued)

Primary Examiner — Yassin Alata
(74) Attorney, Agent, or Firm — HAYES SOLOWAY P.C.

(57) ABSTRACT

A display control method for an ultra high definition television and a 8K ultra high definition television. Said Method comprises: receiving an inputted ultra high definition video signal, and converting the video signal into an RGB signal corresponding to a target resolution (S1); and driving, according to the target resolution corresponding to the RGB signal, a Micro LED display screen to display (S2). When the inputted video signal is a 8K ultra high definition signal, the 8K video signal is converted into an RGB signal, then the RGB signal is transmitted to a drive chip of the Micro LED display screen, and the drive chip lights up the whole Micro LED display screen according to the RGB signal, thereby achieving the display of the ultra high definition television.

14 Claims, 2 Drawing Sheets

(56) References Cited

U.S. PATENT DOCUMENTS

| | | | | |
|---|---|---|---|---|
| 2015/0279335 | A1 | 10/2015 | Ripp et al. | ............... G09G 5/26 |
| 2016/0014422 | A1* | 1/2016 | Su | ........................ H04N 19/124 |
| | | | | 375/240.03 |
| 2016/0155892 | A1* | 6/2016 | Li | ........................... H01L 24/97 |
| | | | | 257/89 |
| 2016/0366390 | A1* | 12/2016 | Nakai | ................... H04N 13/339 |
| 2017/0164024 | A1 | 6/2017 | Zhou | ................... H04N 21/2343 |
| 2019/0073972 | A1 | 3/2019 | Gao et al. | ............ G09G 3/3648 |

FOREIGN PATENT DOCUMENTS

| | | | |
|---|---|---|---|
| CN | 104702859 | 6/2015 | ............. H04N 5/268 |
| CN | 105554549 | 5/2016 | ........... H04N 21/431 |
| CN | 105933726 | 9/2016 | ......... H04N 21/2343 |
| CN | 106847228 | 6/2017 | ............... G09G 3/36 |
| CN | 107205128 | 9/2017 | ............. H04N 5/268 |
| CN | 107995451 | 5/2018 | ............... H04N 7/01 |
| CN | 108282646 | 7/2018 | ............... H04N 9/64 |
| CN | 109151422 | 1/2019 | ............... H04N 9/31 |
| CN | 110999275 | 4/2020 | ............. H04N 5/268 |
| CN | 111696477 | 9/2020 | ............... G09G 3/32 |
| EP | 1755106 | 2/2007 | ............... G09G 5/00 |
| KR | 1020140055503 | 5/2014 | ............... G06T 5/00 |

OTHER PUBLICATIONS

International Preliminary Report on Patentability issued in PCT/CN2020/133654, dated Dec. 6, 2022, 6 pages.

International Search Report and Written Opinion issued in PCT/CN2020/133654, dated Feb. 26, 2021, with English translation, 18 pages.

\* cited by examiner

DISPLAY CONTROL METHOD FOR ULTRA HIGH DEFINITION TELEVISION AND 8K ULTRA HIGH DEFINITION TELEVISION

CROSS-REFERENCES TO RELATED APPLICATIONS

This application is a national phase of PCT Patent Application No. PCT/CN2020/133654, filed on Dec. 3, 2020, which claims priority to Chinese Patent Application No. 202010496174.7, titled "Display control method for ultra high definition television and 8k ultra high definition television", and filed on Jun. 3, 2020. The content of all of which is incorporate herein by reference.

FIELD OF THE INVENTION

The present application relates to the technical field of display control technologies, in particular to a display control method for an ultra high definition television and an 8 k ultra high definition television.

BACKGROUND

An ultra high definition television (UHD TV) in the prior art generally adopts an LCD display screen or an OLED display screen as a display screen. When adopting an LCD display, a plurality of display control parameters shall be considered, including a backlight source, a contrast ratio, and a maximum viewing angle, thus a display effect thereof is worse than that of the OLED display screen having a self-illumination function. An OLED belongs to organic self-luminous display screen, which is composed of a plurality of organic molecular films. Since each pixel being self-luminous, instead of all pixels being luminous at a same time, a working time of each pixel in the OLED is different, a pixel having a longer display period decays faster than a pixel having a shorter display period, thus it is extremely easy to produce an afterimage. Also, when performing a display control to the LCD display screen or the OLED display screen, a control chip is designed for a high-definition video signal, when a video signal being input changes, it is impossible to achieve a compatible display for the video signal having been changed.

Therefore, the current technology needs to be improved and developed.

BRIEF SUMMARY OF THE DISCLOSURE

According to a plurality of defects in the prior art as stated above, an object of the present disclosure is to provide a display control method for an ultra high definition television and the ultra high definition television, in order to solve the technical problem that it is impossible to achieve a compatible display at any resolution for an LCD display screen or an OLED display screen.

A technical solution adopted by the present disclosure to solve the technical problem is as follows:

in a first aspect, the present embodiment provides a display control method for an ultra high definition television, which comprises:

receiving a video signal in an ultra high definition having been input, and converting the video signal into an RGB signal corresponding to a target resolution; the target resolution is a video signal display resolution corresponding to a video playback instruction; the video signal display resolution corresponding to the video playback instruction is equal to or lower than a resolution of the display screen;

driving a Micro LED display screen to display according to the target resolution corresponding to the RGB signal.

The step of converting the video signal into the RGB signal corresponding to the target resolution comprises:

decoding the video signal having been received, and converting the video signal having been decoded into a preset video signal format;

if a resolution of the video signal is higher than the target resolution, reducing the resolution of the video signal in the preset video signal format to the target resolution, performing a screen segmentation on the video signal having been reduced to obtain a multi-channel transition video signal having been segmented, and performing a signal conversion to each of the multi-channel transition video signal, to obtain a multi-channel RGB signal corresponding to the target resolution.

The step of converting the video signal into the RGB signal corresponding to the target resolution comprises:

decoding the video signal having been received, and converting the video signal having been decoded into a preset video signal format;

if the resolution of the video signal is equal to the target resolution, segmenting the video signal in the preset video signal format, then performing the signal conversion on the multi-channel transition video signals obtained by the segmentation to obtain the multi-channel RGB signal corresponding to the target resolution.

The step of converting the video signal into the RGB signal corresponding to the target resolution comprises:

decoding the video signal having been received, and converting the video signal having been decoded into a preset video signal format;

if a resolution of the video signal is lower than the target resolution, amplifying the resolution of the video signal in the preset video signal format to the target resolution, performing a screen segmentation on the video signal having been amplified to obtain a multi-channel transition video signal having been segmented, and performing a signal conversion to each of the multi-channel transition video signal, to obtain a multi-channel RGB signal corresponding to the target resolution.

The step of driving the Micro LED display screen to display according to the target resolution corresponding to the RGB signal comprises:

carrying out a protocol conversion to the RGB signal, and converting an RGB signal in a TCP-IP protocol into an RGB signal in an SPI protocol;

converting the RGB signal in the SPI protocol into a PWM signal corresponding to the target resolution, to drive an LED array in the Micro LED display screen for a display.

After the step of driving the Micro LED display screen to display according to the target resolution corresponding to the RGB signal, further comprises:

obtaining a display state information of each LED light in the Micro LED display screen; the display state information comprises at least one of a temperature value, a voltage value and a current value;

determining whether a display state of each LED lamp or the LED array composed of a plurality of LED lamps is abnormal or not, according to the display state information of each LED lamp;

turning off a power supply of the LED lamp being abnormal or the LED array being abnormal, and/or performing a cooling down process to the LED lamp being abnormal or the LED array being abnormal, if the display state of any one of the LED lamps or any one of the LED arrays is abnormal.

The step of turning off the power supply of the LED lamp being abnormal or the LED array being abnormal, and/or performing the cooling down process to the LED lamp being abnormal or the LED array being abnormal, further comprises:

recording a location information of the LED lamp or the LED array having an abnormal event, and saving a display state information of the LED lamp or the LED array corresponding to the abnormal event.

In a second aspect, the present embodiment discloses an ultra high definition television, which comprises: a control front end and a display screen connecting to the control front end;

the control front end is applied to receiving the video signal in the ultra high definition having been input, and converting the video signal into an RGB signal corresponding to the target resolution; wherein, the target resolution is a display resolution of the video signal corresponding to the video playback instruction; the display resolution of the video signal corresponding to the video playback instruction is equal to or lower than the resolution of the display screen;

the display screen is applied to driving the Micro LED display screen to display according to the RGB signal.

The control front end has a main control SOC chip and a video processing chip arranged;

the main control SOC chip is applied to decoding the video signal having been received, and converting the video signal having been decoded into a preset video signal format, before inputting the video signal having been converted into the preset video signal format to the video processing chip;

the video processing chip is applied to reducing the resolution of the video signal in the preset video signal format to the target resolution, when a resolution of the video signal is higher than the target resolution, and performing a picture segmentation on the video signal having been reduced to obtain a multi-channel transition video signal having been segmented, before performing a signal conversion to each of the multi-channel transition video signal, to obtain a multi-channel RGB signal corresponding to the target resolution.

The control front end has a main control SOC chip and a video processing chip arranged;

the main control SOC chip is applied to decoding the video signal having been received, and converting the video signal having been decoded into a preset video signal format, before inputting the video signal having been converted into the preset video signal format to the video processing chip;

the video processing chip is applied to performing the signal conversion on the multi-channel transition video signals obtained by the segmentation to obtain the multi-channel RGB signal corresponding to the target resolution, after segmenting the video signal in the preset video signal format, if the resolution of the video signal is equal to the target resolution.

The control front end has a main control SOC chip and a video processing chip arranged;

the main control SOC chip is applied to decoding the video signal having been received, and converting the video signal having been decoded into a preset video signal format, before inputting the video signal having been converted into the preset video signal format to the video processing chip;

the video processing chip is applied to amplifying the resolution of the video signal in the preset video signal format to the target resolution, if a resolution of the video signal is lower than the target resolution, and performing a picture segmentation on the video signal having been amplified to obtain a multi-channel transition video signal having been segmented, before performing a signal conversion to each of the multi-channel transition video signal, to obtain a multi-channel RGB signal corresponding to the target resolution.

The display screen has a 4K sending card, a receiving card, a driving chip and a Micro LED panel arranged;

the 4K sending card is applied to performing a picture segmentation to the RGB signal having been input, before sending to the receiving card, or sending directly the RGB signal having been input to the receiving card;

the receiving card is applied to carrying out a protocol conversion to the RGB signal having been input, and converting an RGB signal in a TCP-IP protocol into an RGB signal in an SPI protocol;

the driving chip is applied to converting the RGB signal in the SPI protocol into a PWM signal corresponding to the target resolution, to drive each LED lamp on the Micro LED panel for a corresponding display.

The Micro LED display screen further has a screen power supply and a screen power switch connected; the screen power switch is further connected with the main control SOC chip;

the screen power supply is applied to supplying power to the Micro LED display screen, and the screen power switch is applied to receiving a control signal sent by the main control SOC chip, and controlling the screen power supply to be on and off to the Micro LED display screen according to the control signal.

The main control SOC chip further has a main power supply, a heat dissipation switch connected with the main power supply, and a fan connected with the heat dissipation switch connected;

the heat dissipation switch is applied to receiving a heat dissipation control signal sent by the main control SOC chip, and controlling the fan to dissipate heat from a Micro LED panel, or controlling the fan to stop rotating to stop dissipating heat from the Micro LED panel according to the heat dissipation control signal.

The main control SOC chip is further applied to receiving a display state information of each LED lamp in the Micro LED display screen collected by the receiving card; wherein the display state information comprises at least one of a temperature value, a voltage value and a current value; and determining whether a display state of each LED lamp or the LED array composed of a plurality of LED lamps is abnormal or not, according to the display state information of each LED lamp; and recording a position information of the LED lamp or the LED array having an abnormal event, as well as saving the display state information of the LED lamp or the LED array corresponding to the abnormal event.

The present disclosure provides a display control method for an ultra high definition television and the ultra high definition television, by receiving a video signal in an ultra high definition having been input, and converting the video signal into an RGB signal corresponding to a target resolution; before driving a Micro LED display screen to display according to the target resolution corresponding to the RGB signal. A display screen in the present embodiment is adopting a Micro LED display screen, due to the Micro LED display screen having a characteristic of arbitrary splicing resolutions, thus achieving a compatibility with an RGB signal in any resolution, according to displaying the RGB signal having been converted into the target resolution. When the video signal having been input is an 8K ultra high definition signal, the 8K video signal is converted into an RGB signal through a plurality of signal processes including decoding, image processing, image segmentation, and more, before the RGB signal is transmitted to a driving chip of a Micro LED lamp panel, then the driving chip lights up an entire Micro LED display screen according to a target resolution corresponding to the RGB signal, therefore a display of an ultra high definition television is realized.

DETAILED DESCRIPTION OF EMBODIMENTS

In order to make the purpose, technical solution and the advantages of the present disclosure clearer and more explicit, further detailed descriptions of the present disclosure are stated herein, referencing to the attached drawings and some embodiments of the present disclosure. It should be understood that the detailed embodiments of the disclosure described here are used to explain the present disclosure only, instead of limiting the present disclosure.

It shall be understood by those skilled in the art that the singular forms "a", "an", "the" and "the" as used herein can include the plural forms as well, unless expressly stated otherwise. It should be further understood that the word "comprising" used in the specification of the present disclosure refers to the presence of the stated features, integers, steps, operations, elements and/or components, but does not preclude the presence or addition of one or more other features, Integers, steps, operations, elements, components and/or groups thereof. It will be understood that when we refer to an element as being "connected" or "coupled" to another element, it can be directly connected or coupled to the other element or intervening elements may also be present. Furthermore, "connected" or "coupled" as used herein may include wirelessly connected or wirelessly coupled. As used herein, the term "and/or" includes all or any element and all combination of one or more of the associated listed items.

It shall be understood by one of ordinary skills in the art that, unless otherwise defined, all terms (including technical terms and scientific terms) used herein have the same meaning as commonly understood by one of ordinary skills in the art to which this disclosure belongs. It should also be understood that terms, such as those defined in a general dictionary, should be understood to have meanings consistent with their meanings in the context of the prior art and, unless specifically defined as herein, should not be interpreted in idealistic or overly formal meaning to explain.

A Micro LED is a new generation of display technology, which is made of an inorganic material, being able to shrink an LED screen panel to lower than 100 microns, and reduce a single size to 1% of an original LED, adopting a format of self-illumination, and each sub-pixel of red, green, and blue generates an own light source thereof, before combining into a pixel. A plurality of key properties including a resolution, a color gamut, a brightness, a response speed, a lifespan, and an energy consumption are superior to a mainstream LCD and an emerging OLED. Based on a plurality of advantages stated above, the Micro LED has been applied to a display screen increasingly.

In the prior art, both an LCD screen and an OLED screen are receiving a screen display signal being transmitted, before displaying according to the screen display signal. For the LCD screen and the OLED screen, it is performing a unified control to a display of an entire screen, while in a Micro LED screen, a single LED may be an independent display unit, each pixel may emit light by itself to generate a light source and form a pixel, thus the Micro LED screen has a characteristic of arbitrary splicing resolutions. In the present disclosure, the characteristic of the Micro LED screen is utilized to achieve that an ultra high definition television is able to be compatible with a screen display signal at any resolution, which provides convenience for a smart TV to playback a video signal in any resolution.

The display control method for the ultra high definition television and the ultra high definition television provided by the present disclosure is further described below with reference to a plurality of accompanying drawings and specific application embodiments.

Embodiment I

Figure 1:
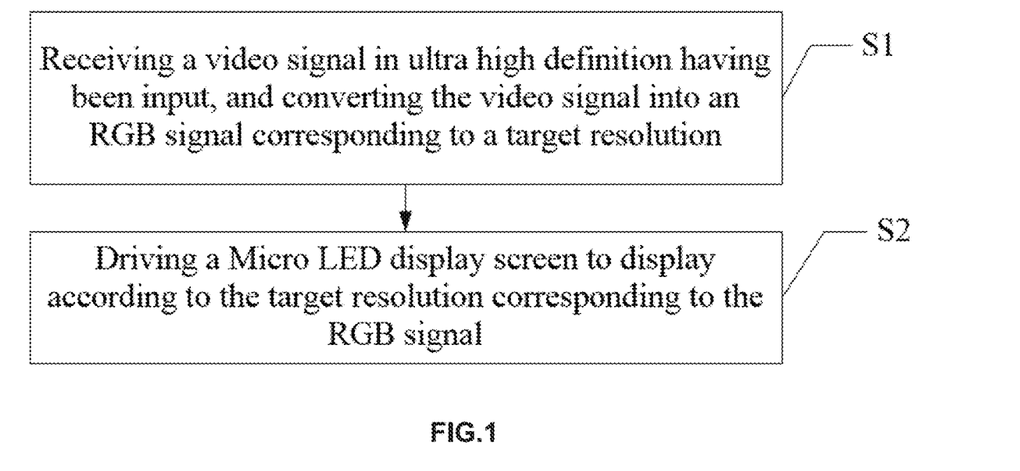
FIG. 1 illustrates a flow chart on a display control method for the ultra high definition television in the present disclosure.

The present embodiment provides a display control method for an ultra high definition television, shown as FIG. 1, comprising:

Step S1, receiving a video signal in an ultra high definition having been input, and converting the video signal into an RGB signal corresponding to a target resolution; wherein the target resolution is a video signal display resolution corresponding to a video playback instruction; the video signal display resolution corresponding to the video playback instruction is equal to or lower than a resolution of the display screen.

When a user is watching a video playing on a smart TV, a display screen is able to display the video according to a video playback resolution corresponding to a video playback instruction issued by the user. The higher the resolution is, the clearer a video image being displayed is, and the video playback resolution corresponding to the video playback instruction issued by the user shall be lower than or equal to the resolution of the display screen, that is, a maximum resolution of a video image displayed on the display screen is equal to or lower than the resolution of the display screen itself, if it exceeds the resolution of the display screen, the video image may not be displayed properly.

Since the present embodiment adopts a Micro LED screen, while each LED lamp in the Micro LED screen can act independently as a pixel, a resolution thereof is able to be displayed in a combination according to a resolution of an image to be displayed. When receiving a video signal in an ultra high definition having been input, the smart TV converts the video signal into an RGB signal. The RGB signal has a display resolution of the video signal corresponding to a video playback instruction sent by the user. The display resolution of the video signal corresponding to the video playback instruction may be equal to or lower than the resolution of the Micro LED screen itself, and the image displayed in the Micro LED screen is a splicing display of multiple LED arrays in the Micro LED screen, while the LCD screen or the OLED screen is converting the resolution of the video signal having been received directly into a same as the resolution of the screen, so as to realize the display of the screen display signal.

Specifically, the present step, wherein the ultra high definition television first receives the video signal in the ultra high definition having been input, then converting the video signal having been input into an RGB signal having a resolution same as that of a video playback corresponding to the video playback instruction, according to the video playback resolution corresponding to the video playback instruction sent by the user, comprising:

Step S11, decoding the video signal having been received, and converting the video signal having been decoded into a preset video signal format.

The ultra high definition television first obtains a video signal from a video signal stream having been received, and decodes to obtain a video signal having been input. If a video signal having been decoded is an 8K or a 4K video signal, it is a video signal in an ultra high definition.

Further, it is a main control SOC chip in the ultra high definition television to receive a video signal, and the main control SOC chip receives the video signal having been input and converts into a unified preset video signal format. The preset video signal format may vary with different video signal having been input, which is specifically a video format conforming to a transmission specification and corresponding to the video signal having been input, for example: an 8K signal or a 4K signal. In an embodiment, if it is an 8K video signal format been input, then a corresponding unified video signal format is the 8K video signal format. If it is a video signal in a 4K signal format or lower been input, it is then converted into a unified video signal format in 4K. In an embodiment, if the video signal having been input is a 2K video signal, it is then converted into a 4K video signal format.

Step S12, if a resolution of the video signal is higher than the target resolution, reducing the resolution of the video signal in the preset video signal format to the target resolution, performing a screen segmentation on the video signal having been reduced to obtain a multi-channel transition video signal having been segmented, and performing a signal conversion to each of the multi-channel transition video signal, to obtain a multi-channel RGB signal corresponding to the target resolution; or if the resolution of the video signal is equal to the target resolution, after segmenting the video signal in the preset video signal format, performing the signal conversion on the multi-channel transition video signals obtained by the segmentation to obtain the multi-channel RGB signal corresponding to the target resolution;

or if a resolution of the video signal is lower than the target resolution, amplifying the resolution of the video signal in the preset video signal format to the target resolution, performing a screen segmentation on the video signal having been amplified to obtain a multi-channel transition video signal having been segmented, and performing a signal conversion to each of the multi-channel transition video signal, to obtain a multi-channel RGB signal corresponding to the target resolution.

First, the main control SOC chip converts uniformly the video signal having been received into a 4K signal or an 8K signal, then converts a resolution of the video signal having a unified format into the target resolution according to the target resolution corresponding to a user input command, and finally performs a reduction process or an amplification process to the video signal before inputting into the back end for display, or inputs the video signal directly into the back end for display, according to a resolution of the video signal.

If the video signal received by the main control SOC chip is a video signal with a resolution of 4K or higher, taking the video signal having been received is an 8K video signal as an example, the main control SOC chip converts the video signal having been received into an 8K signal, then outputs the 8K signal to a video processing chip by a 64 lane V-By-One signal, the video processing chip converts the resolution of the video signal having been received into the target resolution, that is, a resolution that the user wants to display, followed by transmitting to a 4-channel 4K sending card in a backend through a 4-way HDMI2.0. The 4K sending card performs picture segmentation to the RGB signal having been input, before sending to the receiving card. The receiving card inputs the RGB signal having been received into a driving chip, the driving chip drives the display screen to display according to the RGB signal having been received.

If the video signal received by the main control SOC chip is a video signal with a resolution of 4K and below, a 16 lane V-By-One signal being transmitted in the main control SOC chip is input to a video processing chip, the video processing chip processes the video signal being received to a same as the target resolution, then transmits to a 1-channel 4K sending card at the backend through a 1-way HDMI2.0. The 4K sending card performs picture segmentation to the RGB signal being input, before sending to a receiving card. The receiving card inputs the RGB signal having been received to a driving chip, the driving chip drives the display screen to display according to the RGB signal having been received.

Step S2, driving the Micro LED display screen to display according to the target resolution corresponding to the RGB signal.

After the video signal having been received is converted into the RGB signal in the step S1 stated above, the present step will achieve a display control to the Micro LED display screen according to the RGB signal having been converted. Specifically, combining with FIG. 2, after the RGB signal sent from the 4K sending card at a screen end (display screen end) having been transmitted to the receiving card through a network cable, the receiving card transmits the RGB signal to the driving chip, and the driving chip converts the RGB signal to a PWM signal, and use the PWM signal having been converted to drive an LED lamp to display. Specifically, the Micro LED display screen has an LED array composed of a plurality of LED lamps arranged, the driving chip may light up the LED lamps by scanning the LED array line by line according to the PWM signal being converted.

Specifically, the step of driving the Micro LED display screen to display according to the target resolution corresponding to the RGB signal comprises:

carrying out a protocol conversion to the RGB signal, and converting an RGB signal in a TCP-IP protocol into an RGB signal in an SPI protocol, so as to achieve that the RGB signal being transmitted to the driving chip by the receiving card is recognized by the driving chip;

converting the RGB signal in the SPI protocol into a PWM signal corresponding to the target resolution, to drive an LED array in the Micro LED display screen for a display.

The driving chip sends out a corresponding PWM signal according to the RGB signal being received, and drives the LED array to display a corresponding image.

Figure 2:
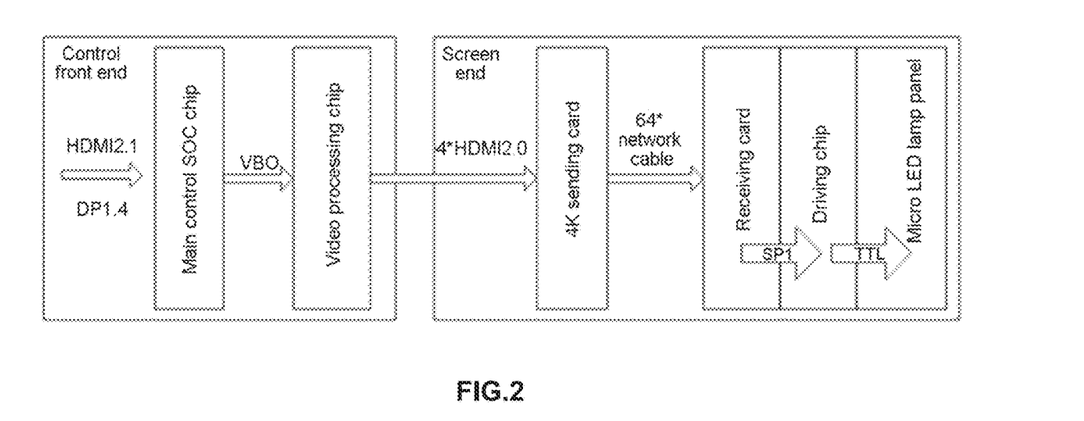
FIG. 2 illustrates a schematic diagram on a signal flow in an embodiment of the ultra high definition television in the present disclosure.

Combining with FIG. 2, taking the video signal being received is an 8K video signal as an embodiment for the display control method provided by the present disclosure.

An 8K SOC motherboard provided in the present disclosure is mainly applied to realizing an 8K signal processing, carrying an Android system. The 8K signal processing comprises receiving 8K signal from an HDMI2.1 interface and a DP1.4 interface, as well as decoding an 8K film source in a flash drive through a USB3.0 interface. An output interface in the 8K SOC motherboard is a 64 lane V-By-One signal. At a same time, an audio signal is sent to a speaker for a sound generation The video processor provided in the present disclosure is applied to realizing a picture segmentation and a signal conversion, dividing the 64 lane V-By-One signal from the 8K main control SOC chip into 4-channel 4K pictures in HDMI2.0 signals: an upper left, an upper right, a lower left, and a lower right respectively.

The 4K sending card provided in the present disclosure is applied to realizing a re-cutting of the picture, cutting the 4K picture into 16 pictures with a resolution of 960*540 and outputting through 16 network cables (TCP-IP protocol). The 4K sending card is implemented by an FPGA. An 8K solution requires four 4K sending cards, and a 4K solution requires one 4K sending card, which is backward compatible.

The receiving card provided in the present disclosure is applied to realizing a cutting and correction to the picture, and converting the RGB signal of the TCP-IP protocol in one network cable into the RGB signal of the SPI protocol. An 8K solution requires 256 receiving cards, a 4K solution requires 64 cards, a 2K solution requires 16 cards, and so on.

A driver mentioned in the present disclosure converts the SPI signal into the PWM signal to drive an RGB LED lamp to light up by a method of line scanning. Taking a driver IC chip MB15759 as an example, by 48 channels and 32 scanning rows, it is possible to drive an LED matrix with 16 RGB columns/rows of pixels*32 rows/columns. The 8K solution will use 4(4K)*4(2K)*4(960*540)*32(120*135) *5×8=81920 chips of MB15759. According to a specification of a driver chip, different units can arrange an LED array suitable for one's requirements.

Further, the receiving card can further obtain lamp panel information of the Micro LED, and transmit the lamp panel information having been obtained to the 8K main control SOC chip on the motherboard. The main control SOC chip on the motherboard determines whether the Micro LED display screen is abnormal or not, according to voltage and current information of the lamp panel, temperature information of the lamp panel or a board card having been obtained, if there is an abnormality happen, the Micro LED display screen will be controlled to be powered off or a fan will be controlled to dissipate heat of the Micro LED display screen.

In one embodiment, after the step of driving the Micro LED display screen to display according to the target resolution corresponding to the RGB signal, it further comprises:

obtaining a display state information of each LED light in the Micro LED display screen; the display state information comprises at least one of a temperature value, a voltage value and a current value; the present step is specifically performed by the receiving card, the receiving card acquires a display state information of each LED lamp in the Micro LED display screen, and sends the display state information to the main control SOC chip.

Determining whether a display state of each LED lamp or the LED array composed of a plurality of LED lamps is abnormal or not, according to the display state information of each LED lamp. The present step is specifically accomplished by the main control SOC chip, and a memory chip controlled by the main control SOC chip stores the display state information of each LED when it is working normally, after receiving the display state information of each LED lamp monitored in a real time sent by the receiving card, the main control SOC chip compares a parameter threshold of a normal working state stored in the memory chip with each parameter value in the display state information having been monitored, to determine whether it has exceeded the parameter threshold of the normal working state. If it exceeds, it is determined that at least one of the LED lamps are abnormal, and a corresponding control operation will be performed according to the abnormality appeared.

If a display state of any one of the LED lamps or any one of the LED arrays is abnormal, the power supply of the LED lamp or the LED array being abnormal will be controlled to be turned off and/or the LED lamp or the LED array being abnormal will be cooled down.

Specifically, if the LED lamp or the LED array has a temperature exceeding a normal value, a fan will be turned on to cool down the LED lamp or the LED array. If the temperature keeps to be over high, a power supply of a Micro LED lamp panel will be turned off, and only a power of a plurality of signal processing board cards is kept on including the 8K main control SOC chip, the video processing chip, the 4K sending card and more, while the main control SOC chip controls to store relevant abnormal information in a storage chip. When a maintenance personnel needs to obtain the relevant abnormal information, the abnormal information will be read from the storage chip, so as to facilitate the maintenance personnel to perform a maintenance according to information recorded in the memory chip.

Figure 3:
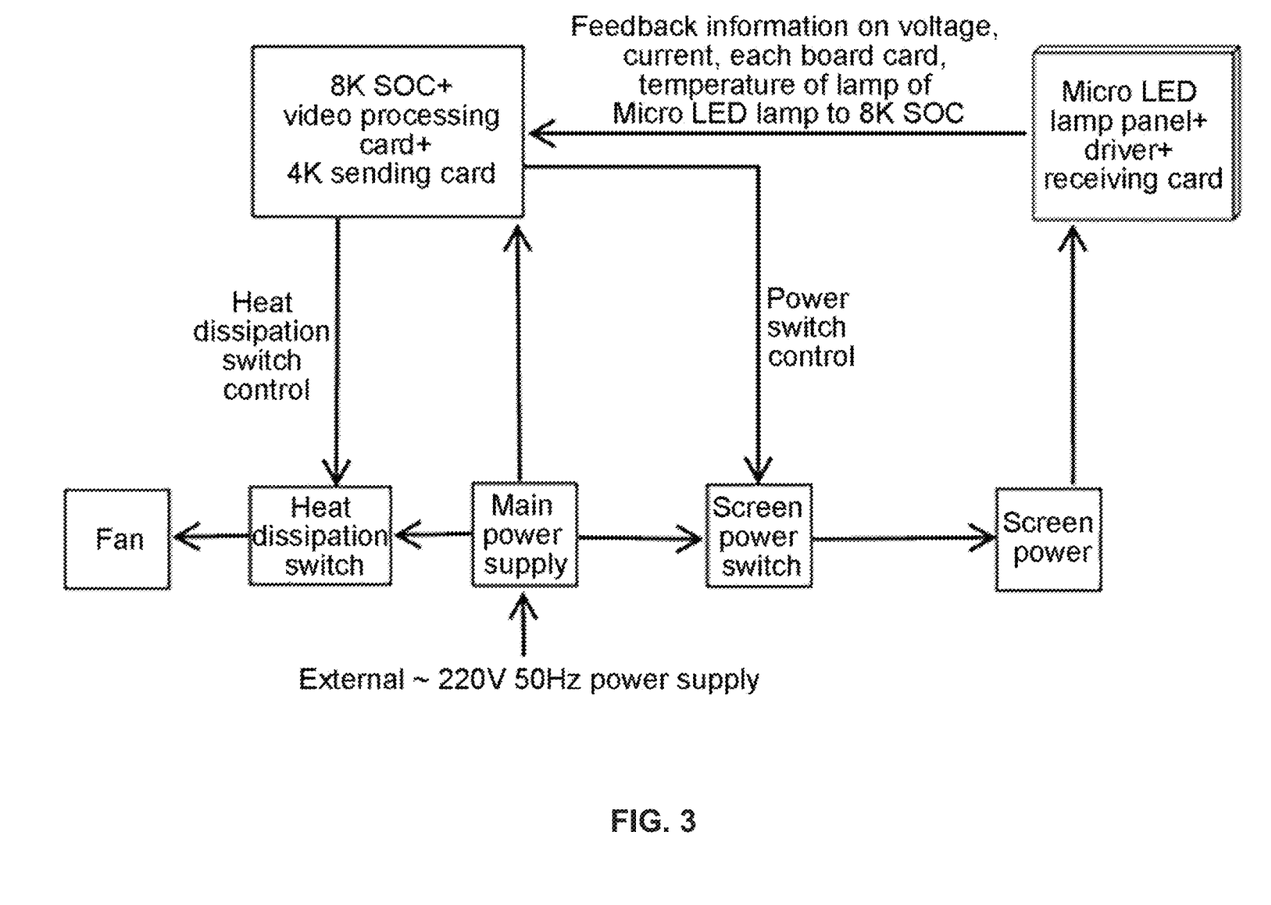
FIG. 3 illustrates a structural schematic diagram on an information monitoring circuit in an embodiment of the ultra high definition television in the present disclosure.

Shown as FIG. 3, due to a particularity of the Micro LED, in order to ensure a performance of the Micro LED being lighting, a quality of an image on display, and a safety in use, it further has a function of monitoring and detecting a circuit in a real time basis. Such a function is mainly achieved by the receiving card: the receiving card reads voltage, current and temperature information of the Micro LED lamp from the memory chip of the main control SOC chip in a real time basis, by communicating with the driving circuit and the chip, and transmits back to a TV motherboard at a same time. It is able to monitor a working state of an entire Micro LED TV easily, which not only ensures a display performance, but also facilitates an examination and a safety maintenance.

The receiving card transmits the information of the Micro LED lamp panel to an 8K motherboard, and the motherboard obtains the voltage and current information of the lamp panel, the temperature information of the lamp panel, a board card or more. Such type of information relates to a display security, the motherboard will issue different control instructions based on a plurality of feedback information, including whether it is a problem in a certain part of the lamp panel or the temperature of the entire lamp panel, to ensure a safety. At a same time, the main control SOC chip will record a plurality of relevant abnormal information to the memory chip, followed by directly connecting the motherboard to a computer, and reading the relevant abnormal information from the memory chip through the motherboard to clarify the problem before repairing.

In an embodiment, when the motherboard reads that the temperature of the lamp panel rises up to 50 degrees, or the temperature of the board card rises up to 60 degrees, the motherboard will control a circuit system to start a heat exhaust fan to cool down the circuit system and ensure a display effect. In an embodiment, when the motherboard reads that the temperature of the lamp panel rises up to 70 degrees, or the temperature of the board card rises up to 80 degrees, or the main control SOC chip reads that the voltage or the current of the Micro LED lamp fed back by the driving chip is abnormal, the main control SOC chip will send out a control instruction, to turn off the power supply for the Micro LED lamp panel, and keep the power supply only on a plurality of signal processing board cards including the main control SOC chip, the video processing chip, the 4K sending card and more.

Specifically, a step of controlling the power supply of the LED lamp or the LED array being abnormal to be turned off and/or the LED lamp or the LED array being abnormal to be cooled down, further comprises:

recording a position information of the LED lamp or the LED array having an abnormal event, as well as saving the display state information of the LED lamp or the LED array corresponding to the abnormal event.

When an abnormal event is detected, the main control SOC chip will record a relevant abnormality, followed by directly connecting the main control SOC chip to a computer, and reading relevant abnormal information from the memory chip through the main control SOC chip, so the maintenance personnel clarify a location of the problem, thus it facilitate to maintenance better.

The present disclosure provides a brand-new solution for an 8K Micro LED TV circuit system, which realizes the 8K processing during a whole process, from inputting to signal processing, further to Micro-LED displaying. A circuit structure design is totally different from an LCD/OLED TV, it is a circuit designed according to a display characteristic of the Micro LED screen.

Due to a Micro LED display panel has a plurality of characters including being flexible and being able to be spliced for any resolutions, the present disclosure provides a display control method for a Micro LED ultra high definition TV, being able to be compatible with a display in any resolutions of 8K and below, and be compatible in a hardware circuit, so as to achieve a display control method for an ultra high definition television with a display in any resolutions.

Embodiment II

On a basis of the display control method stated above, the present embodiment further discloses an 8K ultra high definition TV, combining with FIG. 2, comprising: a control front end and a display screen connecting to the control front end;

the control front end is applied to receiving a video signal in an ultra high definition having been input, and converting the video signal into an RGB signal corresponding to a target resolution; a function thereof is described as the step S1;

the display screen is applied to driving the Micro LED display screen to display according to the RGB signal, a function thereof is described as the step S2.

Specifically, in order to achieve a better signal process, the control front end has a main control SOC chip and a video processing chip arranged; the display screen has a 4K sending card, a receiving card, a driving chip and a Micro LED panel arranged. The main control SOC chip parses the video signal having been received, and converts the video signal into a video signal having a unified resolution, followed by sending the video signal having been converted to the video processing chip. The video processing chip segments or directly copies the video signal according to a resolution size of the video signal having been received, before converting into an RGB signal, and sending the RGB signal having been converted to the 4K sending card. The 4K sending card segments a picture of the RGB signal having been input, before sending to the receiving card. The receiving card performs a second segmentation and a correction to the RGB signal having been received according to a resolution thereof, and sends the RGB signal after segmentation and correction to the driving chip. The driving chip drives each LED lamp on the Micro LED panel for a corresponding picture display, according to the RGB signal having been received.

The main control SOC chip processes the video signal having been received into a 4K/8K signal uniformly, and according to different resolution of the signal having been input, it may be chosen to be processed into a 4K signal or an 8K signal. According to a target resolution corresponding to a video display instruction sent by a user, if the target resolution corresponding to the video display instruction being input by the user is 4K or below, the SOC will output a 4K signal, and the 4K signal will be output to the video processing chip by a 16 lane VBO signal. The video processing chip processes the 4K signal into the resolution required by the user, and transmits to a back-end 1-way 4K sending card through 1-way HDMI2.0, while other three-way 4K sending cards may be unused or copied for output; if the user requires to output 4K or more, such as 5K/8K and more, the main control SOC chip converts the video signal having been input uniformly into an 8K signal to output, and the 8K signal is output to the video processing chip by a 64 lane VBO signal, and the video processing chip processes a resolution of the video signal to the resolution required by the user, and transmits to a back-end 4-way 4K sending card through 4-way HDMI2.0.

The main control SOC chip is applied to decoding the video signal having been received, and converting the video signal having been decoded into a preset video signal format, before inputting the video signal having been converted into the preset video signal format to the video processing chip;

the video processing chip is applied to performing a picture segmentation to the video signal in the preset video signal format, when a resolution of the video signal is higher than the target resolution, and obtaining a multi-channel transition video signal having been segmented, before performing a signal conversion to each of the multi-channel transition video signal, to obtain a multi-channel RGB signal corresponding to the target resolution;

and, if a resolution of the video signal is equal to the target resolution, performing a signal conversion on the video signals in the preset video signal format to obtain the multi-channel RGB signal corresponding to the target resolution;

and, if a resolution of the video signal is lower than the target resolution, amplifying the resolution of the video signal in the preset video signal format to the target resolution, and performing a picture segmentation on the video signal having been amplified to obtain a multi-channel transition video signal having been segmented, before performing a signal conversion to each of the multi-channel transition video signal, to obtain a multi-channel RGB signal corresponding to the target resolution;

the 4K sending card is applied to performing a picture segmentation to the RGB signal having been input, before sending to the receiving card;

the receiving card is applied to carrying out a protocol conversion to the RGB signal having been input, and converting an RGB signal in a TCP-IP protocol into an RGB signal in an SPI protocol;

the driving chip is applied to converting the RGB signal in the SPI protocol into a PWM signal corresponding to the target resolution, to drive each LED lamp on the Micro LED panel for a corresponding display.

Further, the Micro LED display screen has a screen power supply and a screen power switch connected; the screen power switch is further connected with the main control SOC chip;

the screen power supply is applied to supplying power to the Micro LED display screen, and the screen power switch is applied to receiving a control signal sent by the main control SOC chip, and controlling the screen power supply to be on and off to the Micro LED display screen according to the control signal.

Further, the main control SOC chip has a main power supply, a heat dissipation switch connected with the main power supply, and a fan connected with the heat dissipation switch connected;

the heat dissipation switch is applied to receiving a heat dissipation control signal sent by the main control SOC chip, and controlling the fan to dissipate heat from a Micro LED panel, or controlling the fan to stop rotating to stop dissipating heat from the Micro LED panel according to the heat dissipation control signal.

Further, the main control SOC chip is applied to receiving a display state information of each LED lamp in the Micro LED display screen collected by the receiving card; wherein the display state information comprises at least one of a temperature value, a voltage value and a current value; and determining whether a display state of each LED lamp or the LED array composed of a plurality of LED lamps is abnormal or not, according to the display state information of each LED lamp; and recording a position information of the LED lamp or the LED array having an abnormal event, as well as saving the display state information of the LED lamp or the LED array corresponding to the abnormal event.

The present disclosure provides a display control method for an ultra high definition television and an 8K ultra high definition television, by receiving a video signal in an ultra high definition having been input, and converting the video signal into an RGB signal corresponding to a target resolution; before driving a Micro LED display screen to display according to the target resolution corresponding to the RGB signal. A display screen in the present embodiment is adopting a Micro LED display screen, due to the Micro LED display screen having a characteristic of arbitrary splicing resolutions, thus achieving a compatibility with an RGB signal in any resolution, according to displaying the RGB signal having been converted into the target resolution. When the video signal having been input is an 8K ultra high definition signal, the 8K video signal is converted into an RGB signal through a plurality of signal processes including decoding, image processing, image segmentation, and more, before the RGB signal is transmitted to a driving chip of a Micro LED lamp panel, then the driving chip lights up an entire Micro LED display screen according to a target resolution corresponding to the RGB signal, therefore a display of an ultra high definition television is realized.

It should be understood that, the application of the present disclosure is not limited to the above examples listed. Ordinary technical personnel in this field can improve or change the applications according to the above descriptions, all of these improvements and transforms should belong to the scope of protection in the appended claims of the present disclosure.

What is claimed is:

1. A display control method for an ultra high definition television, comprising:
    receiving a video signal in an ultra high definition having been input, and converting the video signal into an RGB signal corresponding to a target resolution, wherein the target resolution is a video signal display resolution corresponding to a video playback instruction, and wherein the video signal display resolution corresponding to the video playback instruction is equal to or lower than a resolution of the display screen; and
    driving a Micro LED display screen to display according to the target resolution corresponding to the RGB signal by:
        carrying out a protocol conversion to the RGB signal, and converting an RGB signal in a TCP-IP protocol into an RGB signal in an SPI protocol; and
        converting the RGB signal in the SPI protocol into a PWM signal corresponding to the target resolution, to drive an LED array in the Micro LED display screen for a display.

2. The display control method for the ultra high definition television according to claim 1, wherein the step of converting the video signal into the RGB signal corresponding to the target resolution comprises:
    decoding the video signal having been received, and converting the video signal having been decoded into a preset video signal format; wherein
    when a resolution of the video signal is higher than the target resolution, reducing the resolution of the video signal in the preset video signal format to the target resolution, performing a screen segmentation on the video signal having been reduced to obtain a multi-channel transition video signal having been segmented, and performing a signal conversion to each of the multi-channel transition video signal to obtain a multi-channel RGB signal corresponding to the target resolution.

3. The display control method for the ultra high definition television according to claim 1, wherein the step of converting the video signal into the RGB signal corresponding to the target resolution comprises:
    decoding the video signal having been received, and converting the video signal having been decoded into a preset video signal format; wherein
    when a resolution of the video signal is equal to the target resolution, segmenting the video signal in the preset video signal format, then performing the signal conversion on the multi-channel transition video signals obtained by the segmentation to obtain the multi-channel RGB signal corresponding to the target resolution.

4. The display control method for the ultra high definition television according to claim 1, wherein the step of converting the video signal into the RGB signal corresponding to the target resolution comprises:
    decoding the video signal having been received, and converting the video signal having been decoded into a preset video signal format; wherein when a resolution of the video signal is lower than the target resolution, amplifying the resolution of the video signal in the preset video signal format to the target resolution, performing a screen segmentation on the video signal having been amplified to obtain a multi-channel transition video signal having been segmented, and performing a signal conversion to each of the multi-channel transition video signal to obtain a multi-channel RGB signal corresponding to the target resolution.

5. The display control method for the ultra high definition television according to claim 1, wherein after the step of driving the Micro LED display screen to display according to the target resolution corresponding to the RGB signal, further comprises:
   obtaining a display state information of each LED light in the Micro LED display screen; the display state information comprises at least one of a temperature value, a voltage value, and a current value;
   determining whether a display state of each LED lamp or the LED array composed of a plurality of LED lamps is abnormal according to the display state information of each LED lamp; and
   turning off a power supply of the LED lamp or the LED array being abnormal, and/or performing a cooling down process to the LED lamp or the LED array being abnormal, when the display state of any one of the LED lamps or any one of the LED arrays is abnormal.

6. The display control method for the ultra high definition television according to claim 5, wherein the step of turning off the power supply of the LED lamp or the LED array being abnormal, and/or performing the cooling down process to the LED lamp or the LED array being abnormal further comprises:
   recording a location information of the LED lamp or the LED array having an abnormal event, and saving a display state information of the LED lamp or the LED array corresponding to the abnormal event.

7. An 8K ultra high definition television, comprising:
   a control front end and a display screen connecting to the control front end;
   wherein the control front end is configured to receive the video signal in the ultra high definition having been input, and convert the video signal into an RGB signal corresponding to the target resolution, wherein the target resolution is a display resolution of the video signal corresponding to the video playback instruction, wherein the display resolution of the video signal corresponding to the video playback instruction is equal to or lower than the resolution of the display screen;
   wherein the display screen is configured to drive the Micro LED display screen to display according to the RGB signal; and
   wherein the display screen has a 4K sending card, a receiving card, a driving chip, and a Micro LED panel arranged, wherein:
      the 4K sending card is configured to perform a picture segmentation to the RGB signal having been input, and send to the receiving card, or send directly the RGB signal having been input to the receiving card;
      the receiving card is configured to carry out a protocol conversion to the RGB signal having been input, and convert an RGB signal in a TCP-IP protocol into an RGB signal in an SPI protocol; and
      the driving chip is configured to convert the RGB signal in the SPI protocol into a PWM signal corresponding to the target resolution to drive each LED lamp on the Micro LED panel for a corresponding display.

8. The 8K ultra high definition television according to claim 7, wherein the control front end has a main control SOC chip and a video processing chip arranged;
   the main control SOC chip is configured to decode the video signal having been received, and convert the video signal having been decoded into a preset video signal format to input the video signal having been converted into the preset video signal format to the video processing chip; and
   the video processing chip is configured to reduce a resolution of the video signal in the preset video signal format to the target resolution when the resolution of the video signal is higher than the target resolution, perform a picture segmentation on the video signal having been reduced to obtain a multi-channel transition video signal having been segmented, and perform a signal conversion to each of the multi-channel transition video signal to obtain a multi-channel RGB signal corresponding to the target resolution.

9. The 8K ultra high definition television according to claim 7, wherein the control front end has a main control SOC chip and a video processing chip arranged;
   the main control SOC chip is configured to decode the video signal having been received, convert the video signal having been decoded into a preset video signal format, and input the video signal having been converted into the preset video signal format to the video processing chip; and
   the video processing chip, when a resolution of the video signal is equal to the target resolution, is configured to perform the signal conversion on the multi-channel transition video signals obtained by the segmentation to obtain the multi-channel RGB signal corresponding to the target resolution after segmenting the video signal in the preset video signal format.

10. The 8K ultra high definition television according to claim 7, wherein the control front end has a main control SOC chip and a video processing chip arranged;
    the main control SOC chip is configured to decode the video signal having been received, convert the video signal having been decoded into a preset video signal format, and input the video signal having been converted into the preset video signal format to the video processing chip; and
    the video processing chip, when a resolution of the video signal is lower than the target resolution, is configured to amplify the resolution of the video signal in the preset video signal format to the target resolution, perform a picture segmentation on the video signal having been amplified to obtain a multi-channel transition video signal having been segmented, and perform a signal conversion to each of the multi-channel transition video signal to obtain a multi-channel RGB signal corresponding to the target resolution.

11. The 8K ultra high definition television according to claim 7, wherein the Micro LED display screen further has a screen power supply and a screen power switch connected; the screen power switch is further connected with the main control SOC chip;
    wherein the screen power supply is configured to supply power to the Micro LED display screen, and the screen power switch is configured to receive a control signal sent by the main control SOC chip, and control the screen power supply to be on and off to the Micro LED display screen according to the control signal.

12. The 8K ultra high definition television according to claim 11, wherein the main control SOC chip further has a main power supply, a heat dissipation switch connected with the main power supply, and a fan connected with the heat dissipation switch connected;
   wherein the heat dissipation switch is configured to receive a heat dissipation control signal sent by the main control SOC chip, and control the fan to dissipate heat from a Micro LED panel or control the fan to stop rotating to stop dissipating heat from the Micro LED panel according to the heat dissipation control signal.

13. The 8K ultra high definition television according to claim 12, wherein the main control SOC chip is further configured to:
   receive a display state information of each LED lamp in the Micro LED display screen collected by the receiving card, wherein the display state information comprises at least one of a temperature value, a voltage value, and a current value; and
   determine whether a display state of each LED lamp or the LED array composed of a plurality of LED lamps is abnormal according to the display state information of each LED lamp, and record a position information of the LED lamp or the LED array having an abnormal event, as well as to save the display state information of the LED lamp or the LED array corresponding to the abnormal event.

14. An 8K ultra high definition television, comprising:
   a control front end and a display screen connecting to the control front end;
   wherein the control front end is configured to receive the video signal in the ultra high definition having been input, and convert the video signal into an RGB signal corresponding to the target resolution, wherein the target resolution is a display resolution of the video signal corresponding to the video playback instruction, wherein the display resolution of the video signal corresponding to the video playback instruction is equal to or lower than a resolution of the display screen; and
   wherein the display screen is configured to drive the Micro LED display screen to display according to the RGB signal by:
      carrying out a protocol conversion to the RGB signal, and converting an RGB signal in a TCP-IP protocol into an RGB signal in an SPI protocol; and
      converting the RGB signal in the SPI protocol into a PWM signal corresponding to the target resolution, to drive an LED array in the Micro LED display screen for a display.

* * * * *